United States Patent [19]

Idel et al.

[11] 4,342,681
[45] Aug. 3, 1982

[54] USE OF ORGANIC SILICON COMPOUNDS IN COMBINATION WITH OXETANE COMPOUNDS, DIOXANES OR TETRAHYDROFURANES FOR STABILIZING AND BRIGHTENING POLYCARBONATES WHICH ARE FREE FROM PHOSPHITES AND FREE FROM BORIC ACID ESTERS

[75] Inventors: Karsten Idel, Krefeld; Wolfgang Cohnen, Leverkusen; Dieter Freitag, Krefeld, all of Fed. Rep. of Germany

[73] Assignee: Bayer Aktiengesellschaft, Leverkusen, Fed. Rep. of Germany

[21] Appl. No.: 148,622

[22] Filed: May 12, 1980

[30] Foreign Application Priority Data

May 21, 1979 [DE] Fed. Rep. of Germany ....... 2920451

[51] Int. Cl.³ ............................ C08K 5/15; C08K 5/54
[52] U.S. Cl. .................................... 524/108; 524/264;
524/106; 524/111; 524/611
[58] Field of Search .................... 260/45.7 R, 45.8 A,
260/29.1 SB

[56] References Cited

U.S. PATENT DOCUMENTS

| | | | |
|---|---|---|---|
| 3,625,920 | 12/1971 | Borkowski | 260/47 |
| 3,794,629 | 2/1974 | Eimers et al. | 260/45.8 A |
| 4,066,611 | 1/1978 | Axelrod | 260/45.8 A |
| 4,073,769 | 2/1978 | Eimers et al. | 260/45.8 R |
| 4,102,859 | 7/1978 | Eimers et al. | 260/45.8 A |
| 4,138,379 | 2/1979 | Scott et al. | 260/29.1 R |
| 4,225,483 | 9/1980 | Eimers et al. | 260/45.8 A |
| 4,230,611 | 10/1980 | Mark et al. | 260/29.1 SB |

FOREIGN PATENT DOCUMENTS

| | | |
|---|---|---|
| 1770329 | 8/1970 | Fed. Rep. of Germany . |
| 2510463 | 9/1976 | Fed. Rep. of Germany . |
| 2658849 | 6/1977 | Fed. Rep. of Germany . |
| 2659756 | 7/1977 | Fed. Rep. of Germany . |
| 2741064 | 3/1978 | Fed. Rep. of Germany . |
| 1141869 | 2/1969 | United Kingdom . |
| 1429699 | 3/1976 | United Kingdom . |
| 1561890 | 3/1980 | United Kingdom . |

*Primary Examiner*—John Kight, III
*Assistant Examiner*—R. A. White
*Attorney, Agent, or Firm*—Gene Harsh; Lawrence S. Pope; Aron Preis

[57] ABSTRACT

The present invention relates to polycarbonate composition characterized in the absence therefrom of phosphites and boric acid esters which compositions are made stable and bright by the incorporation of organic silicon compounds in combination with oxetane, dioxane or tetrahydrofurane compounds.

14 Claims, No Drawings

USE OF ORGANIC SILICON COMPOUNDS IN COMBINATION WITH OXETANE COMPOUNDS, DIOXANES OR TETRAHYDROFURANES FOR STABILIZING AND BRIGHTENING POLYCARBONATES WHICH ARE FREE FROM PHOSPHITES AND FREE FROM BORIC ACID ESTERS

FIELD OF THE INVENTION

The present invention relates to the use of organic silicon compounds in combination with oxetane compounds, dioxanes or tetrahydrofuranes for stabilizing and brightening polycarbonates which are free from phosphites and free from boric acid esters, in amounts of 0.01 to 1.0% by weight, preferably in amounts of 0.1 to 0.75% by weight, relative to the total weight of polycarbonate and stabilizer combination, of the particular stabilizer combination of organic silicon compound and one of the other organic costabilizers.

The stabilizer combinations usually consist of 30% by weight to 90% by weight, preferably of 50% by weight to 90% by weight, of the particular organic silicon compound and of 70% by weight to 10% by weight, preferably 50% by weight to 10% by weight, of one of the other organic costabilizers.

The polycarbonates to be stabilized preferably have a water content of less than 0.01% by weight, relative to the weight of polycarbonate resin; preferably they are prepared by the known solution processes and are preferably free from pigments.

BACKGROUND OF THE INVENTION

According to DOS (German Published Specification) No. 2,726,662, silanes or epoxides are employed as costabilizers in specific polycarbonates stabilized by phosphites.

According to DOS (German Published Specification) No. 2,659,756, siloxanes and, if appropriate, epoxide compounds are employed for stabilizing polycarbonates stabilized by phosphites.

According to DOS (German Published Specification) No. 2,741,064, silanols are employed for stabilizing pigment-containing polycarbonates stabilized by phosphites and/or stabilized by epoxides.

According to DOS (German Published Specification) No. 2,140,207, phosphites containing oxetane groups are employed for stabilizing polycarbonates.

According to DOS (German Published Specification) No. 2,255,639, phosphites containing oxetane groups are likewise added to stabilize polycarbonates, it also being possible for the phosphites to contain tetrahydrofuryl radicals.

According to DOS (German Published Specification) No. 2,510,463, esters of silicic acid together with oxetane compounds and/or specific dioxane compounds and/or specific tetrahydrofurane compounds can be employed for stabilizing polycarbonates stabilized by phosphites (see pages 4, 5 and 6 of that reference).

According to European Patent Application No. 78 101 260 (LeA 18, 380-EP), esters of salicic acid together with oxetane compounds and/or specific dioxane compounds and/or specific tetrahydrofurane compounds can be employed for stabilizing polycarbonates stabilized by boric acid esters (see pages 5, 15 and 18 of that reference).

According to DOS (German Published Specification) No. 2,658,849, oxetane compounds, optionally together with phosphites, are employed for stabilizing polycarbonates.

According to British Patent Specification No. 1,141,869, silanes which are suitable as transesterification catalysts for the preparation of polycarbonates by the melt transesterification process are those which at the same time have a stabilizing effect and thus do not cause discoloration and clouding of the prepared polycarbonate, a side effect caused by some transesterification catalysts. The silanes employed contain at most one alkoxy-silane radical. According to DE-OS (German Published Specification) No. 1,770,329 and U.S. Pat. No. 3,625,920, such silanes can also be employed together with borates, as transesterification catalysts for the same purpose.

However, from these literature references it cannot be deduced that the addition of organic silicon compounds to polycarbonates, in particular to those which are prepared by the solution process, have a brightening, in addition to a stabilizing effect vis degradation upon exposure to heat.

In U.S. Pat. No. 4,138,379, silanes, optionally in combination with phosphites and/or epoxides, are claimed as additives to increase the melt flow and as stabilizers towards oxidative degradation under heat. In all the examples of that reference however, a mixture of 1 part of diphenyl octyl phosphite and 2 parts of 3,4-epoxycyclohexylmethyl 3,4-epoxycyclohexanecarboxylate is also added, so that it is not shown whether the silicon compounds have a sufficiently stabilizing effect by themselves, i.e. without the phosphites which are of little advantage in promoting the hydrolytic properties of polycarbonate. Moreover, a positive effect is described only after processing and not after heat aging for a long period.

DETAILED DESCRIPTION OF THE INVENTION

It has now been found that organic silicon compounds in combination with oxetane compounds, dioxanes or tetrahydrofuranes are suitable for stabilizing and brightening polycarbonates which are free from phosphites and free from boric acid esters, and especially also those which are free from pigments.

In comparison to non-stabilized polycarbonate, the aromatic polycarbonates stabilized according to the invention have a significantly higher light transparency and constancy of color, both directly after thermoplastic processing and after a heat aging lasting several thousand hours. Especially after heat aging, the polycarbonates stabilized according to the invention are found to be superior to those containing triorganophosphites on the basis of their smaller change in color.

Moreover, the stabilizer mixtures do not influence the hydrolytic stability of these polycarbonates while triorgano-phosphites in general cause a considerable reduction of that property, especially vis boiling water, such as purification or upon sterilization.

Preferred organic silicon compounds to be used according to the invention are those of the general formula:

$$(R_1)_a\text{—Si—}(OR_2)_b \tag{1}$$

wherein
a+b=4, b is at least 1, preferably 3 or 4, $R_1$ is H, $C_1$–$C_{18}$-alkyl, $C_2$–$C_{18}$-alkenyl, $C_6$–$C_{24}$-aryl, $C_7$–$C_{24}$-alkylaryl or $C_7$–$C_{24}$-aralkyl and $R_2$ is $C_1$–$C_{18}$-alkyl, $C_2$–$C_{18}$-alkenyl, $C_5$–$C_{10}$-cycloalkyl or $C_7$–$C_{24}$-aralkyl.

The alkyl and alkenyl radicals $R_1$ and $R_2$ can be linear or branched.

The C radicals $R_1$ and $R_2$ can contain any desired, non-basic substituents which are stable and inert under the influence of heat during thermoplastic processing of the polycarbonates, such as, for example, halogen atoms, such as: chlorine or bromine, $C_1$–$C_{18}$-alkoxy groups, $C_6$–$C_{24}$-aryloxy groups, heterocyclic radicals containing oxygen, sulphur and/or non-basic nitrogen atoms, keto groups, ester groups, nitrile groups, ether groups and/or thioether groups.

Examples of preferred radicals $R_1$ are methyl, ethyl, vinyl, propyl, 3-chloropropyl, 3-methacryloxypropyl, 3-glycidyloxypropyl, butyl, pentyl, hexyl and cyclohexyl.

Examples of preferred radicals $R_2$ are butyl, pentyl, hexyl, octyl, stearyl, decyl, cyclohexyl, methylcyclohexyl, (3-methyloxetan-3-yl)-methyl, (3-ethyloxetan-3-yl)-methyl, (3-amyloxetan-3-yl)-methyl, 2-methoxy-ethyl, 3-methoxy-propyl, 3-ethoxy-propyl, 3-(thiomethyl)-propyl, (5-ethyl-1,3-dioxan-5-yl)-methyl and 2,3-epoxy-propyl.

There are mainly two processes available for the preparation of the silicon compounds of the formula 1:

1. Reaction of silicon halides with alcohols according to the equation:

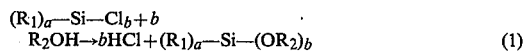

$$(R_1)_a\text{—Si—Cl}_b + b\ R_2OH \rightarrow bHCl + (R_1)_a\text{—Si—}(OR_2)_b \quad (1)$$

2. Transesterification of silicic acid esters of lower alcohols with the corresponding alcohols, the lower alcohols liberated, that is to say ethanol and methanol, being distilled off, according to the equation:

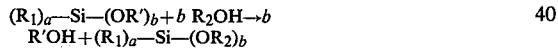

$$(R_1)_a\text{—Si—}(OR')_b + b\ R_2OH \rightarrow b\ R'OH + (R_1)_a\text{—Si—}(OR_2)_b$$

$R' = CH_3, C_2H_5$.

The preparation by these methods is described for example, in: D. Ridge and M. Todd, J. Chem. Soc. 1949, pages 2,637–2,640 or V. Bazant, V. Chvalovsky', J. Rathousky': Organosilicon Compounds, Volume I, pages 51–61, Academic Press, New York 1965.

The preparation of epoxides, oxetanes and tetrahydrofuranes is described, for example, in Houben Weyl "Methoden der organischen Chemie" ("Methods of Organic Chemistry"), Volume VI, 3, George Thieme Verlag, Stuttgart, 1965, in pages 366–434 (epoxides), 488–508 (oxetanes) and 523–592 (tetrahydrofuranes) and in Houben Weyl "Methoden der organischen Chemie" ("Methods of Organic Chemistry"), Volume VI, 4, George Thieme Verlag, Stuttgart, 1966, in pages 411–430 (dioxanes).

The following compounds, for example, can be used as the stabilizing silicon compounds, of formula 1: tetrabutoxysilane, tetrapentoxysilane, tetrahexoxysilane, tetraoctoxysilane, tetradecoxysilane, tetrastearoxysilane, tetracyclohexoxysilane, tetrakis-(methyl-cyclohexoxy)-silane, methyl-tributoxysilane, methyl-trihexoxysilane, methyl-trioctoxysilane, methyl-tridecoxysilane, methyl-tristearoxysilane, methyl-tricyclohexoxysilane, methyl-tris-(methyl-cyclohexoxy)-silane, vinyl-tributoxysilane, vinyl-trihexoxysilane, vinyl-trioctoxysilane, vinyl-trihexoxysilane, vinyl-tristearoxysilane, vinyl-tricyclohexoxysilane, vinyl-tris-(methyl-cyclohexoxy)-silane, tributoxysilane, trihexoxysilane, trioctoxysilane, tridecoxysilane, tetrakis-(2-hydroxyethyl-ethoxy)-silane, methyl-tris-(2-hydroxyethyl-ethoxy)-silane, vinyl-tris-(2-hydroxyethyl-ethoxy)-silane, vinyl-tris-(2-methoxy-ethoxy)-silane, methyl-tris-(2-methoxy-ethoxy)-silane, 3-chloropropyl-triethoxysilane, 3-chloropropyl-tributoxysilane, 3-chloropropyl-trihexoxysilane, 3-chloropropyl-trioctoxysilane, 3-glycidylpropoxy-triethoxysilane, 3-glycidylpropoxy-tributoxysilane, 3-glycidylpropoxy-trihexoxysilane, 3-glycidyl propoxy-trioctoxysilane, isobutyl-tributoxysilane, isobutyl-trioctoxysilane, tetrakis-(2-methoxyethoxy)-silane, 3-methacryloxypropyl-trimethoxysilane, tetrakis-[(3-methyloxetan-3-yl)-methoxy]-silica, tetrakis-[(3-ethyloxetan-3-yl)-methoxy]-silane, tetrakis-[(3-amyl-oxetan-3-yl)-methoxy]-silane, methyl-tris-[(3-methyl-oxetan-3-yl)-methoxy]-silane, methyl-[(3-ethyloxetan-3-yl)-methoxy]-silane, dimethyl-bis-[(3-methyloxetan-3-yl)-methoxy]-silane, dimethyl-bis-[(3-ethyloxetan-3-yl)-methoxy]-silane, tetrakis-[(5-ethyl-1,3-dioxan-5-yl)-methoxy]-silane, methyl-tris-[(5-ethyl-1,3-dioxan-5-yl)-methoxy]-silane, tetrakis-(2,3-epoxypropoxy)-silane and methyl-tris-(2,3-epoxy-propoxy)-silane.

Oxetane compounds which are suitable according to the invention are those of the general formula:

wherein $R_3$, $R_4$, $R_5$, $R_6$, $R_7$, and $R_8$ can be identical or different and can be H, $C_1$–$C_{18}$-alkyl, $C_5$–$C_{12}$-cycloalkyl, $C_6$–$C_{15}$-aryl, $C_7$–$C_{15}$-aralkyl, $C_7$–$C_{15}$-alkaryl, $C_1$–$C_{18}$-hydroxyalkyl, $C_2$–$C_{18}$-alkoxyalkyl, ($C_6$–$C_{15}$-aryl)-oxymethyl, ($C_7$–$C_{15}$-aralkyl)-oxy-methyl or monoacyloxymethyl, a monoacyl radical of a monobasic or polybasic carboxylic acid being suitable.

Those oxetans in which:

$R_3$, $R_4$, $R_7$ and $R_8$ are hydrogen, $R_5$ has the above-mentioned meaning and $R_6$ represents a radical —$CH_2$—O—X, wherein X is H, $C_1$–$C_{17}$-alkyl, $C_6$–$C_{15}$-aryl, $C_7$–$C_{15}$-aralkyl, $C_7$–$C_{15}$-alkaryl or a monoacyl radical of a monobasic or polybasic carboxylic acid, are particularly preferred.

Tetrahydrofuranes which are suitable according to the invention are those of the general formula:

wherein the radicals $R_9$ to $R_{16}$ have the same meaning as the radicals $R_3$ to $R_8$ in formula (2).

Moreover, one of the radicals $R_9$–$R_{16}$ can represent a single bond to a corresponding second radical of the formula (3).

In addition, $R_9$ to $R_{16}$ can represent radicals of the formulae —CH$_2$O—X and/or —COO—Y, wherein:

X has the meaning as defined in connection with formula (2) and

Y corresponds to one of the radicals $R_3$ to $R_8$.

Moreover, in each case two of the radicals $R_9$ to $R_{16}$ which are in the α,β-position relative to one another can be replaced by an epoxy bridge, and in each case two of the radicals $R_9$ and $R_{16}$ which are in the α,α-position relative to one another can be replaced by a $C_4$- to $C_6$-alkylene.

Dioxanes which are suitable according to the invention are those of the general formulae:

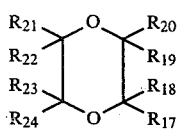 (4)

and

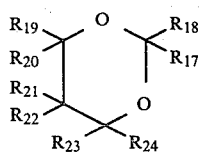 (5)

wherein the radicals $R_{17}$ to $R_{24}$ have the same meaning as the radicals $R_3$ to $R_8$ in formula (2).

Moreover, one of the radicals $R_{17}$ to $R_{24}$ can represent a single bond to a corresponding second radical of the formula (4) or (5); in addition, $R_{17}$ to $R_{24}$ can represent radicals of the formulae —CH$_2$O—X and/or —COO—Y, wherein X and Y are as defined in connection with formula (3).

Examples of the oxetanes, tetrahydrofuranes and dioxanes which are suitable according to the invention are: 3-ethyl-oxetan-3-yl-carboxylic acid ethyl ester, 3-ethyl-oxetan-3-yl-carboxylic acid [3-ethyl-oxetan-3-yl]-methyl ester, 3-amyl-oxetan-3-yl-carboxylic acid [3-amyl-oxetan-3-yl]-methyl ester, 3-hydroxymethyl-3-ethyloxetane, 3-phenoxymethyl-3-ethyloxetane, 3-phenoxy-methyl-3-amyloxetane, [3-ethyloxetan-3-yl]-methyl benzoate, [3-ethyl-oxetan-3-yl]-methyl stearate, bis-([3-ethyl-oxetan-3-yl]-methyl)phthalate, bis-([3-ethyl-oxetan-3-yl]-methyl) carbonate, bis-([3-ethyl-oxetan-3-yl]-methyl) adipate, 2-hydroxymethyl-tetrahydrofurane, 2-(3-hydroxypropyl)-tetrahydrofurane, 2-(5-hydroxy-pentane)-tetrahydrofurane, 2,5-bis[3-hydroxypropyl]-tetrahydrofurane and 2,5-bis(hydroxymethyl)-tetrahydrofurane, and esters thereof, for example of benzoic acid, stearic acid, oleic acid, adipic acid, phthalic acid, trimesic acid, carbonic acid and the like, 1-phenyl-3-tetrahydrofuran-2-yl-propane, 2,2,5,5-tetramethyl-tetrahydrofurane, 2,2,5,5-bis-(pentamethylene)-tetrahydrofurane, 2,2,5,5-tetraphenyl-tetrahydrofurane, bis-(tetrahydrofuran-3-yl), 3,4-epoxy-tetrahydrofurane, 3,3-dicarbethoxy-tetrahydrofurane, 2,5-diethoxy-tetrahydrofurane, 2,5-bis-[1,1-dimethoxyethyl]-tetrahydrofurane, 2,5-diethoxy-1,4-dioxane, 2,2,6,6-tetramethyl-1,4-dioxane, 2-benzoyloxy-1,4-dioxane, 2-hydroxymethyl-1,4-dioxane, 2-[3-hydroxypropyl]-1,4-dioxane, 2-hydroxymethyl-1,3-dioxane, 5,5-ethyl-hydroxymethyl-1,3-dioxane, 5,5-amyl-hydroxymethyl-1,3-dioxane and 5,5-methyl-hydroxymethyl-1,3-dioxane, and esters of these hydroxy-alkyl-dioxanes with, for example, benzoic acid, stearic acid, oleic acid, adipic acid, phthalic acid, trimesic acid, carbonic acid and the like.

Incorporation of the stabilizer mixtures to be used according to the invention into the aromatic polycarbonates can be effected either by metering the stabilizer mixtures directly into the molten polycarbonate or metering them into the polycarbonate solution as a solute in a low-boiling solvent. The stabilized, aromatic polycarbonates can also be prepared by impregnating the powdered or granular polycarbonate with the pulverulent or liquid stabilizer mixtures in a suitable mixing apparatus by tumbling and subsequent thermoplastic processing in accordance with known arts.

Aromatic polycarbonates in the sense of this invention are homopolycarbonates and copolycarbonates which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl)ethers, bis-(hydroxyphenyl) ketones, bis-(hydroxyphenyl) sulphoxides, bis-(hydroxyphenyl) sulphones and α,α'-bis-(hydroxyphenyl)-diisopropylbenzenes, and their nuclear-alkylated and nuclear-halogenated compounds. These and other suitable diphenols are described, for example, in U.S. Pat. Nos. 3,028,365; 2,999,835; 3,148,172; 3,275,601; 2,991,273; 3,271,367; 3,062,781 and 2,999,846, in German Offenlegungsschriften (German Published Specification) Nos. 1,570,703; 2,063,050; 2,063,052; 2,211,956 and 2,211,957, French Patent Specification No. 1,561,518, in the monograph "H. Schnell, Chemistry and Physics of Polycarbonates, Interscience Publishers, New York, 1964".

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)cyclohexane.

Preferred aromatic polycarbonates are those based on one or more of the diphenols mention as preferred. Copolycarbonates which are based on 2,2-bis-(4-hydroxyphenyl)-propane and one of the other diphenols mentioned as particularly preferred are particularly preferred. Polycarbonates based on 2,2-bis-(4-hydroxyphenyl)-propane or on 2,2-bis-(3,5-dimethyl-4-hydroxyphenyl)-propane alone are also particularly preferred.

The aromatic polycarbonates can be prepared by known processes, thus, for example, from bisphenol and diphenyl carbonate by the melt transesterification process, and from bisphenols and phosgene, by the known solution processes, as is described in the abovementioned literature. Suitable solution processes are both the process in a homogeneous phase system, the so-called pyridine process, and the process in a heterogeneous phase system, the so-called two-phase boundary process.

Polycarbonates which have been prepared by the known solution processes, in particular, by the two-phase boundary process, are most suitable for stabilization according to the present invention.

The aromatic polycarbonates can be branched by incorporating small amounts, preferably amounts between 0.05 and 2.0 mol % (relative to the diphenols employed), of compounds which are trifunctional or more than trifunctional, for example, those with three or more phenolic hydroxyl groups.

Polycarbonates of this type are described, for example, in German Offenlegungsschriften (German Published Specification) Nos. 1,570,533; 1,595,762; 2,116,974 and 2,113,347; British Patent Specification No. 1,079,821, U.S. Pat. No. 3,544,514 and in German Offenlegungsschrift (German Published Specification) No. 2,500,092 (LeA 16,142).

Examples of some of the compounds which have three or more phenolic hydroxyl groups and can be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane 2,2-bis[4,4-bis-(4-hydroxyphenyl)cyclohexyl]-propane, 2,4-bis-(4-hydroxyphenyl-isopropyl)-phenol, 2,6-bis-(2'hydroxy-5'-methyl-benzyl)-4-methylphenol, 2-(4-hydroxyphenyl)-2-(2,4-dihydroxyphenyl)propane and 1,4-bis-(4,4''-dihydroxytriphenyl-methyl)benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

The aromatic polycarbonates should as a rule have mean weight-average molecular weights $\overline{M}_w$ of 10,000 to over 200,000, preferably of 20,000 to 80,000, determined by measuring the relative viscosity in $CH_2Cl_2$ at 25° C. and at a concentration of 0.5% by weight.

In the case of the polycarbonate mixtures, small proportions of low-molecular polycarbonates, for example, with an average degree of polymerization of 2–20, can also be admixed in the higher molecular polycarbonates ($\overline{M}_w$ of 10,000 to 200,000).

As is customary, other additives can be admixed with the aromatic polycarbonates before, during or after their preparation process, the stabilizer mixtures to be used according to the invention being distinguished by outstanding compatibility with other additives, such as, for example, UV absorbers or flameproofing agents.

Examples of other additives are: mold release agents, dyestuffs, UV absorbers, inorganic pigments and fillers, such as glass fibers, graphite, asbestos, metal powder and the like.

In the following text, the invention is described in more detail by examples, without thereby being limited.

EXAMPLES

A polycarbonate based on bisphenol A, having a solution viscosity of $\eta_{rel}$ of 1.285 (0.5 g of polycarbonate in 100 ml of methylene chloride), being free from stabilizing additives and having been prepared from 2,2-bis-(4-hydroxyphenyl)-propane and phosgene in a known manner by the two-phase boundary process was used as the base material for the investigations.

Various stabilizer mixtures were incorporated into this polycarbonate and the polycarbonates stabilized in this manner were investigated, in comparison with phosphite-stabilized material, in terms of light transmission directly after processing and after heat aging at 140° C. for 1,500 hours, and in the terms of resistance to hydrolysis in boiling water. The incorporation was effected by tumbling the particular stabilizer with the polycarbonate and subsequently subjecting the mixture to thermoplastic processing, for example, in a twin-screw extruder. The granules obtained were processed to standard test specimens in an injection-molding machine.

The light transmission of these standard test specimens was measured, on material which had been freshly injection-molded, at 420 nm in accordance with the method of DIN 5033 and DIN 4646. The same measurement was repeated after heat aging at 140° C. for 1,500 hours and the color of the test specimens was evaluated. The heat aging was carried out in air. In the hydrolysis test, the test specimens were treated in water boiling under atmospheric pressure and were evaluated after a boiling time of 100 hours in each case.

The following stabilizers or stabilizer mixtures were incorporated into the polycarbonate and their effects examined:

I: tris-[(3-ethyloxetan-3-yl)-methyl] phosphite

II: 310 parts by weight (1 mol) of triphenyl phosphite/426 parts by weight (1.5 mols) of cyclohexane-1, 2-dicarboxylic acid bis-epoxypropyl ester [phosphite/epoxide mixture]

III: tetraoctoxysilane

IV: 1 part by weight of tetraoctoxysilane and 1 part by weight of 3-ethyl-3-hydroxymethyloxetane V: 2 parts by weight of tetraoctoxysilane and 1 part by weight of 3-ethyl-3-hydroxymethyloxetane VI: 1 part by weight of tetrakis-[(3-ethyloxetan-3-yl)-methoxy-silane and 1 part by weight of bis-[(3-ethyloxetan-3-yl-methyl] carbonate VII: 1 part by weight of tetraoctoxysilane and 1 part by weight of 2,2,6,6-tetramethyl-1,4-dioxane VIII: 1 part by weight of tetraoctoxysilane and 1 part by weight of 3,4-epoxy-tetrahydrofurane IX 1 part by weight of tetraoctoxysilane and 1 part by weight of tetrakis-[(5-ethyl-1,3-dioxan-5-yl)-methyl]-carbonate.

The results of the light transmission measurement of I-IX directly after processing and after heat aging at 140° C. for 1,500 hours and the evaluation of the color after heat aging are shown in Table 1.

The primary brightening by the stabilizer mixtures to be used according to the invention is in the order of size of the values obtained with phosphites or mixtures thereof, for example with epoxides.

The superiority of the stabilizer mixtures compared with phosphites and mixtures thereof is clearly shown by a better light transmission and color after heat aging and by the good hydrolytic stability, compared with non-stabilized polycarbonate, while phosphite-stabilized polycarbonate suffers a significant decrease in molecular weight and loss of mechanical properties after half of the boiling time (700 hours) (see Table 2).

TABLE 1

| Polycarbonate ($\eta_{rel}$:1.285) + % by weight of stabilizer | | Light transmission at 420 nm (freshly injection molded sample) | Light transmission at 420 nm after heat aging at 140° C. for 1,500 hours | Color after heat aging at 140° C. for 1,500 hours |
|---|---|---|---|---|
| 0.1 | I | 0.850 | 0.700 | brownish |
| 0.1 | II | 0.840 | 0.490 | yellowish |
| 0.1 | III | 0.850 | 0.790 | almost colorless |
| 0.1 | IV | 0.850 | 0.780 | almost colorless |
| 0.1 | V | 0.855 | 0.785 | almost colorless |
| 0.1 | VI | 0.855 | 0.790 | almost colorless |
| 0.1 | VII | 0.845 | 0.785 | almost colorless |
| 0.1 | VIII | 0.855 | 0.795 | almost colorless |
| 0.1 | IX | 0.855 | 0.800 | almost colorless |

TABLE 2

| Boiling time (hours) | Polycarbonate without stabilizer | | Polycarbonate containing 0.1% by weight of tris-[(3-ethyl-oxetan-3-yl)-methyl]phosphite | | Polycarbonate containing 1 part by weight of tetraoctoxy-silane and part by weight of tetrakis-[(5-ethyl-1,3-dioxan-5-yl)-methyl]carbonate | |
|---|---|---|---|---|---|---|
| | $\eta_{rel}$ | Impact Strength (kg/m²) | $\eta_{rel}$ | Impact Strength (kg/m²) | $\eta_{rel}$ | Impact Strength (kg/m²) |
| 0 Value | 1.289 | n.b. | 1.289 | n.b. | 1.290 | n.b. |
| 100 | 1.285 | n.b. | 1.259 | n.b. (9) 90.9 (1) | 1.287 | n.b. |
| 200 | 1.284 | n.b. | 1.160 | n.b. (4) 16.2 (6) | 1.283 | n.b. |
| 300 | 1.275 | n.b. | 1.104 | 4.9 | 1.277 | n.b. |
| 400 | 1.274 | n.b. (9) 16.6 (1) | 1.171 | 1.8 | 1.274 | n.b. |
| 500 | 1.269 | 44.4 | 1.155 | 1.0 | 1.266 | n.b. (8) 49.8 (2) |
| 700 | 1.261 | n.b. (3) 46.0 (7) | 1.117 | 0.8 | 1.259 | n.b. (4) 46.1 (6) |
| 1,000 | 1.251 | n.b. (2) 49.7 (8) | — | — | 1.250 | n.b. (4) 45.6 (6) |
| 1,250 | 1.242 | n.b. (1) 11.1 (9) | — | — | 1.244 | n.b. (5) 38.7 (5) |
| 1,500 | 1,237 | 14.2 | — | — | 1.238 | 33.2 |

$\eta_{rel}$ = relative solution viscosity (0.5 g in 100 ml of methylene chloride)
n.b. = no failure

What is claimed is:

1. A polycarbonate composition comprising polycarbonate resin prepared by a solution process characterized in the absence therefrom of phosphites and boric acid esters and, a stabilizing and brightening agent comprising 0.01 to 1.0 percent by weight of said composition comprising components (i) an organic silicon compound of the general formula:

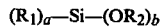

wherein
a+b=4, b is 1 to 4, $R_1$ is H, $C_1$-$C_{18}$ alkyl, $C_2$-$C_{18}$-alkenyl $C_6$-$C_{24}$ aralkyl and $R_2$ is $C_1$-$C_{18}$-alkyl, $C_2$-$C_{18}$ alkenyl, $C_5$-$C_{10}$-cycloalkyl or $C_7$-$C_{24}$-aralkyl and (ii) one or more members of the group consisting of
(a) oxetane compounds having the general formula:

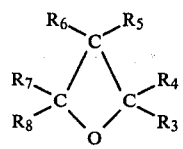

(b) dioxane compounds having the general formula:

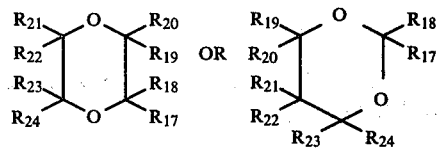

and
(c) tetrahydrofurane compounds having the general formula:

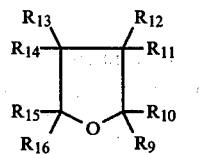

wherein $R_3$ to $R_{24}$ can be the same or different and may be H, $C_1$-$C_{18}$ alkyl, $C_5$-$C_{12}$ cycloalkyl, $C_6$-$C_{15}$-aryl, $C_7$-$C_{15}$ aralkyl, $C_7$-$C_{15}$ alkaryl, $C_1$-$C_{18}$-hydroxyalkyl, $C_2$-$C_{18}$-alkoxyalkyl, ($C_6$-$C_{15}$-aryl)oxymethyl, and ($C_7$-$C_{15}$-aralkyl)-oxymethyl and for said (b) and (c) $R_9$ to $R_{24}$ may additionally be monoacyloxymethyl.

2. The polycarbonate composition of claim 1 wherein said stabilizing and brightening agent comprises 0.1 to 0.75 percent by weight of said composition.

3. The polycarbonate composition of claim 1 or claim 2 wherein no pigments are added.

4. The polycarbonate composition of claim 1 or claim 2 wherein said stabilizing and brightening agent comprises 30 to 90 percent by weight of said component (i) and 70 to 10 percent by weight of said component (ii).

5. A process for stabilizing and brightening a polycarbonate resin prepared by a solution process characterized in the absence therefrom of phosphites and boric acid esters comprising incorporating therein a stabilizing and brightening agent comprising components:

(i) an organic silicon compound of the general formula:

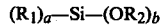

wherein a+b=4, b is 1 to 4, $R_1$ is H, $C_1$-$C_{18}$ alkyl, $C_2$-$C_{18}$-alkenyl, $C_6$-$C_{24}$ aralkyl and $R_2$ is $C_1$-$C_{18}$-alkyl, $C_2$-$C_{18}$ alkenyl, $C_5$-$C_{10}$-cycloalkyl or $C_7$-$C_{24}$-aralkyl and (ii) one or more members of the group consisting of
(a) oxetane compounds having the general formula:

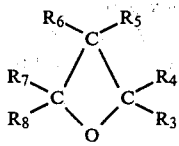

(b) dioxane compounds having the general formula:

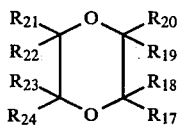 OR 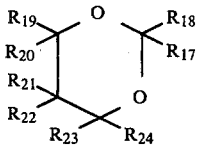

and (c) tetrahydrofurane compounds having the general formula:

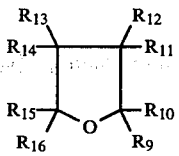

wherein $R_3$ to $R_{24}$ can be the same or different and may be H, $C_1$–$C_{18}$ alkyl, $C_5$–$C_{12}$ cycloalkyl, $C_6$–$C_{15}$-aryl, $C_7$–$C_{15}$ aralkyl, $C_7$–$C_{15}$ alkaryl, $C_1$–$C_{18}$-hydroxyalkyl, $C_2$–$C_{18}$-alkoxyalkyl, ($C_6$–$C_{15}$-aryl)oxymethyl, and ($C_7$–$C_{15}$-aralkyl)-oxymethyl and for said (b) and (c) $R_9$ to $R_{24}$ may additionally be monoacyloxymethyl, said stabilizing said brightening agent comprising between 0.01 and 1.0 percent relative to the weight of said resin plus said agent.

6. The process of claim 5 wherein said stabilizing and brightening agent comprises between 0.1 and 0.75 percent relative to the weight of said resin plus said agent.

7. The process of claim 5 or claim 6 wherein no pigments are added.

8. The process of claim 5 or claim 6 wherein said stabilizing and brightening agent comprises 30 to 90 percent by weight of said component (i) and 70 to 10 percent by weight of said component (ii).

9. The polycarbonate composition of claim 1 wherein said b of the general formula:

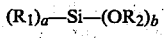

is 3 to 4.

10. The process of claim 5 wherein said b of the general formula:

is 3 to 4.

11. A polycarbonate composition comprising polycarbonate resin prepared by a solution process characterized in the absence therefrom of phosphites and boric acid esters and, a stabilizing and brightening agent comprising 0.01 to 1.0 percent by weight of said composition comprising components:

(i) an organic silicon compound of the general formula:

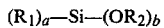

wherein $a+b=4$, b is 1 to 4, $R_1$ is H, $C_1$–$C_{18}$ alkyl, $C_2$–$C_{18}$-alkenyl, $C_6$–$C_{24}$ aralkyl and $R_2$ is $C_1$–$C_{18}$-alkyl, $C_2$–$C_{18}$ alkenyl, $C_5$–$C_{10}$-cycloalkyl or $C_7$–$C_{24}$-aralkyl and (ii) at least one dioxane compound having the general formula:

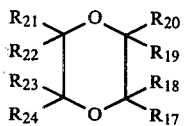 OR 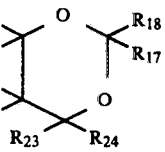

wherein $R_{17}$ to $R_{24}$ may independently be H, $C_1$–$C_{18}$ alkyl, $C_5$–$C_{12}$ cycloalkyl, $C_6$–$C_{15}$-aryl, $C_7$–$C_{15}$ aralkyl, $C_7$–$C_{15}$ alkaryl, $C_1$–$C_{18}$-hydroxyalkyl, $C_2$–$C_{18}$-alkoxyalkyl, ($C_6$–$C_{15}$-aryl)-oxymethyl, ($C_7$–$C_{15}$-aralkyl)oxymethyl or monoacyloxymethyl.

12. A polycarbonate composition comprising polycarbonate resin prepared by a solution process characterized in the absence therefrom of phosphites and boric acid esters and, a stabilizing and brightening agent comprising 0.01 to 1.0 percent by weight of said composition comprising components:

(i) an organic silicon compound of the general formula:

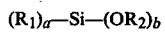

wherein $a+b=4$, b is 1 to 4, $R_1$ is H, $C_1$–$C_{18}$ alkyl, $C_2$–$C_{18}$-alkenyl, $C_6$–$C_{24}$ aralkyl and $R_2$ is $C_1$–$C_{18}$-alkyl, $C_2$–$C_{18}$ alkenyl, $C_5$–$C_{10}$-cycloalkyl or $C_7$–$C_{24}$-aralkyl and (ii) at least one tetrahydrofurane compound having the general formula:

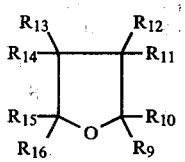

wherein $R_9$ to $R_{16}$ may independently be H, $C_1$–$C_{18}$ alkyl, $C_5$–$C_{12}$ cycloalkyl, $C_6$–$C_{15}$-aryl, $C_7$–$C_{15}$ aralkyl, $C_7$–$C_{15}$ alkaryl, $C_1$–$C_{18}$-hydroxyalkyl, $C_2$–$C_{18}$-alkoxyalkyl, ($C_6$–$C_{15}$-aryl)-oxymethyl, ($C_7$–$C_{15}$-aralkyl)oxymethyl or monoacyloxymethyl.

13. A process for stabilizing and brightening a polycarbonate resin prepared by a solution process characterized in the absence therefrom of phosphites and boric acid esters comprising incorporating therein a stabilizing and brightening agent comprising components:

(i) an organic silicon compound of the general formula:

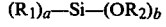

wherein $a+b=4$, b is 1 to 4, $R_1$ is H, $C_1$–$C_{18}$ alkyl, $C_2$–$C_{18}$-alkenyl, $C_6$–$C_{24}$ aralkyl and $R_2$ is $C_1$–$C_{18}$-alkyl, $C_2$–$C_{18}$ alkenyl, $C_5$–$C_{10}$-cycloalkyl or $C_7$–$C_{24}$-aralkyl and (ii) at least one dioxane compound having the general formula:

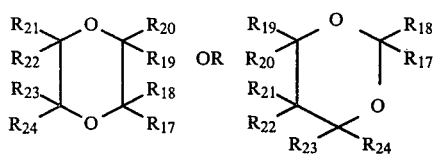

wherein $R_{17}$ to $R_{24}$ may independently be H, $C_1$–$C_{18}$ alkyl, $C_5$–$C_{12}$ cycloalkyl, $C_6$–$C_{15}$-aryl, $C_7$–$C_{15}$ aralkyl, $C_7$–$C_{15}$ alkaryl, $C_1$–$C_{18}$-hydroxyalkyl, $C_2$–$C_{18}$-alkoxyalkyl, ($C_6$–$C_{15}$-aryl)-oxymethyl, ($C_7$–$C_{15}$-aralkyl)-oxymethyl or monoacyloxymethyl said stabilizing and brightening agent comprising between 0.01 and 1.0 percent relative to the weight of said resin plus said agent.

14. A process for stabilizing and brightening a polycarbonate resin prepared by a solution process characterized in the absence therefrom of phosphites and boric acid esters comprising incorporating therein a stabilizing and brightening agent comprising components (i) an organic silicon compound of the general formula:

$$(R_1)_a\text{—Si—}(OR_2)_b$$

wherein $a+b=4$, b is 1 to 4, $R_1$ is H, $C_1$–$C_{18}$ alkyl, $C_2$–$C_{18}$-alkenyl, $C_6$–$C_{24}$ aralkyl and $R_2$ is $C_1$–$C_{18}$-alkyl, $C_2$–$C_{18}$ alkenyl, $C_5$–$C_{10}$-cycloalkyl or $C_7$–$C_{24}$-aralkyl and (ii) at least one tetrahydrofurane compound having the general formula:

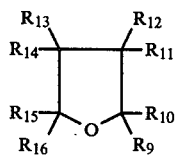

wherein $R_9$ to $R_{16}$ can be the same or different and may be H, $C_1$–$C_{18}$ alkyl, $C_5$–$C_{12}$ cycloalkyl, $C_6$–$C_{15}$-aryl, $C_7$–$C_{15}$ aralkyl, $C_7$–$C_{15}$ alkaryl, $C_1$–$C_{18}$ hydroxyalkyl, $C_2$–$C_{18}$-alkoxyalkyl, ($C_6$–$C_{15}$-aryl)-oxymethyl, ($C_7$–$C_{15}$-aralkyl)-oxymethyl or monoacyloxymethyl, said stabilizing and brightening agent comprising between 0.01 and 1.0 percent relative to the weight of said resin plus said agent.

* * * * *